(12) United States Patent
Carlson et al.

(10) Patent No.: US 8,756,361 B1
(45) Date of Patent: Jun. 17, 2014

(54) DISK DRIVE MODIFYING METADATA CACHED IN A CIRCULAR BUFFER WHEN A WRITE OPERATION IS ABORTED

(75) Inventors: Marcus A. Carlson, Berthoud, CO (US); David C. Pruett, Longmont, CO (US)

(73) Assignee: Western Digital Technologies, Inc., Irvine, CA (US)

(*) Notice: Subject to any disclaimer, the term of this patent is extended or adjusted under 35 U.S.C. 154(b) by 177 days.

(21) Appl. No.: 13/166,695

(22) Filed: Jun. 22, 2011

Related U.S. Application Data

(63) Continuation-in-part of application No. 12/895,855, filed on Oct. 1, 2010.

(51) Int. Cl.
*G06F 12/00* (2006.01)

(52) U.S. Cl.
USPC ........ 711/4; 711/200; 711/206; 711/E12.014; 711/E12.016; 711/E12.058; 711/E12.095

(58) Field of Classification Search
None
See application file for complete search history.

(56) References Cited

U.S. PATENT DOCUMENTS

| | | | |
|---|---|---|---|
| 5,450,560 A * | 9/1995 | Bridges et al. | 711/200 |
| 5,574,882 A * | 11/1996 | Menon et al. | 711/114 |
| 5,613,066 A | 3/1997 | Matsushima et al. | |
| 5,680,538 A * | 10/1997 | Jones et al. | 714/5.11 |
| 5,696,921 A * | 12/1997 | Holt | 711/4 |
| 6,016,553 A | 1/2000 | Schneider et al. | |
| 6,092,231 A | 7/2000 | Sze | |
| 6,148,368 A | 11/2000 | DeKoning | |
| 6,185,063 B1 | 2/2001 | Cameron | |
| 6,202,121 B1 | 3/2001 | Walsh et al. | |
| 6,324,604 B1 | 11/2001 | Don et al. | |
| 6,339,811 B1 | 1/2002 | Gaertner et al. | |
| 6,501,905 B1 * | 12/2002 | Kimura | 386/295 |
| 6,574,774 B1 | 6/2003 | Vasiliev | |
| 6,675,281 B1 * | 1/2004 | Oh et al. | 711/207 |
| 6,732,124 B1 | 5/2004 | Koseki et al. | |
| 6,772,274 B1 | 8/2004 | Estakhri | |

(Continued)

FOREIGN PATENT DOCUMENTS

WO 20091102425 A1 8/2009

OTHER PUBLICATIONS

Denis Howe, "Circular Buffer Definition", 2010, The Free On-Line Dictionary of Computing, pp. 1-3, http://dictionary.reference.com/browse/circular+buffer.*

(Continued)

*Primary Examiner* — Edward Dudek, Jr.
*Assistant Examiner* — Christopher Birkhimer

(57) ABSTRACT

A disk drive is disclosed comprising a head actuated over a rotatable disk. A write operation is processed to write data on the disk using the head, wherein prior to writing the data on the disk, logical-to-physical mapping information is stored in a circular buffer, wherein the logical-to-physical mapping information identifies locations on the disk to write the data. A plurality of metadata files are written on the disk using the head, wherein the plurality of metadata files are interspersed with the data on the disk and each of the metadata files includes contents of the circular buffer at a time the metadata file is written on the disk. When the write operation is aborted, the logical-to-physical mapping information in the circular buffer is modified to identify the locations on the disk actually written.

8 Claims, 11 Drawing Sheets

(56) References Cited

U.S. PATENT DOCUMENTS

| | | | |
|---|---|---|---|
| 6,829,688 B2 | 12/2004 | Grubbs et al. | |
| 6,886,068 B2 | 4/2005 | Tomita | |
| 6,895,468 B2 | 5/2005 | Rege et al. | |
| 6,901,479 B2 | 5/2005 | Tomita | |
| 6,920,455 B1 | 7/2005 | Weschler | |
| 6,967,810 B2 | 11/2005 | Kasiraj et al. | |
| 6,970,987 B1* | 11/2005 | Ji et al. | 711/162 |
| 7,055,055 B1 | 5/2006 | Schneider et al. | |
| 7,155,448 B2 | 12/2006 | Winter | |
| 7,343,517 B2 | 3/2008 | Miller et al. | |
| 7,406,487 B1* | 7/2008 | Gupta et al. | 1/1 |
| 7,408,731 B2 | 8/2008 | Uemura et al. | |
| 7,412,585 B2 | 8/2008 | Uemura | |
| 7,472,223 B1* | 12/2008 | Ofer | 711/112 |
| 7,486,460 B2 | 2/2009 | Tsuchinaga et al. | |
| 7,490,212 B2* | 2/2009 | Kasiraj et al. | 711/172 |
| 7,509,471 B2 | 3/2009 | Gorobets | |
| 7,526,614 B2 | 4/2009 | van Riel | |
| 7,529,880 B2 | 5/2009 | Chung et al. | |
| 7,539,924 B1 | 5/2009 | Vasquez et al. | |
| 7,549,021 B2 | 6/2009 | Warren, Jr. | |
| 7,590,816 B2* | 9/2009 | Shinohara et al. | 711/170 |
| 7,594,067 B2* | 9/2009 | Torabi | 711/103 |
| 7,603,530 B1 | 10/2009 | Liikanen et al. | |
| 7,617,358 B1 | 11/2009 | Liikanen et al. | |
| 7,620,772 B1 | 11/2009 | Liikanen et al. | |
| 7,631,009 B1 | 12/2009 | Patel et al. | |
| 7,647,544 B1 | 1/2010 | Masiewicz | |
| 7,669,044 B2 | 2/2010 | Fitzgerald et al. | |
| 7,685,360 B1 | 3/2010 | Brunnett et al. | |
| 7,831,750 B2* | 11/2010 | Sampathkumar | 710/59 |
| 7,840,878 B1 | 11/2010 | Tang et al. | |
| 7,860,836 B1 | 12/2010 | Natanzon et al. | |
| 7,870,355 B2 | 1/2011 | Erofeev | |
| 7,876,769 B2* | 1/2011 | Gupta et al. | 370/428 |
| 7,885,921 B2 | 2/2011 | Mahar et al. | |
| 7,903,659 B2* | 3/2011 | Sindhu et al. | 370/392 |
| 7,965,465 B2 | 6/2011 | Sanvido et al. | |
| 7,996,645 B2 | 8/2011 | New et al. | |
| 8,006,027 B1 | 8/2011 | Stevens et al. | |
| 8,214,684 B2 | 7/2012 | Hetzler et al. | |
| 8,341,339 B1 | 12/2012 | Boyle et al. | |
| 2002/0049886 A1* | 4/2002 | Furuya et al. | 711/114 |
| 2003/0123701 A1 | 7/2003 | Dorrell et al. | |
| 2003/0220943 A1 | 11/2003 | Curran et al. | |
| 2004/0019718 A1 | 1/2004 | Schauer et al. | |
| 2004/0109376 A1 | 6/2004 | Lin | |
| 2004/0139310 A1* | 7/2004 | Maeda et al. | 713/2 |
| 2005/0069298 A1 | 3/2005 | Kasiraj et al. | |
| 2005/0071537 A1 | 3/2005 | New et al. | |
| 2005/0144517 A1 | 6/2005 | Zayas | |
| 2005/0193035 A1 | 9/2005 | Byrne | |
| 2006/0090030 A1 | 4/2006 | Ijdens et al. | |
| 2006/0112138 A1 | 5/2006 | Fenske et al. | |
| 2006/0117161 A1 | 6/2006 | Venturi | |
| 2006/0181993 A1 | 8/2006 | Blacquiere et al. | |
| 2007/0174582 A1 | 7/2007 | Feldman | |
| 2007/0204100 A1 | 8/2007 | Shin et al. | |
| 2007/0226394 A1* | 9/2007 | Noble | 711/4 |
| 2007/0294589 A1 | 12/2007 | Jarvis et al. | |
| 2008/0098195 A1 | 4/2008 | Cheon et al. | |
| 2008/0104308 A1 | 5/2008 | Mo et al. | |
| 2008/0168243 A1* | 7/2008 | Bychkov et al. | 711/161 |
| 2008/0183955 A1 | 7/2008 | Yang et al. | |
| 2008/0183975 A1* | 7/2008 | Foster et al. | 711/153 |
| 2008/0195801 A1 | 8/2008 | Cheon et al. | |
| 2008/0209144 A1* | 8/2008 | Fujimoto | 711/162 |
| 2008/0250200 A1* | 10/2008 | Jarvis et al. | 711/113 |
| 2008/0256287 A1 | 10/2008 | Lee et al. | |
| 2008/0256295 A1 | 10/2008 | Lambert et al. | |
| 2008/0270680 A1 | 10/2008 | Chang | |
| 2008/0307192 A1 | 12/2008 | Sinclair et al. | |
| 2009/0019218 A1 | 1/2009 | Sinclair et al. | |
| 2009/0055620 A1 | 2/2009 | Feldman et al. | |
| 2009/0063548 A1 | 3/2009 | Rusher et al. | |
| 2009/0070529 A1* | 3/2009 | Mee et al. | 711/114 |
| 2009/0119353 A1 | 5/2009 | Oh et al. | |
| 2009/0144493 A1* | 6/2009 | Stoyanov | 711/110 |
| 2009/0150599 A1 | 6/2009 | Bennett | |
| 2009/0154254 A1 | 6/2009 | Wong et al. | |
| 2009/0164535 A1 | 6/2009 | Gandhi et al. | |
| 2009/0164696 A1 | 6/2009 | Allen et al. | |
| 2009/0193184 A1 | 7/2009 | Yu et al. | |
| 2009/0198952 A1 | 8/2009 | Khmelnitsky et al. | |
| 2009/0204750 A1 | 8/2009 | Estakhri et al. | |
| 2009/0222643 A1 | 9/2009 | Chu | |
| 2009/0235042 A1* | 9/2009 | Petrocelli | 711/170 |
| 2009/0240873 A1 | 9/2009 | Yu et al. | |
| 2009/0271581 A1 | 10/2009 | Hinrichs, Jr. | |
| 2010/0011275 A1 | 1/2010 | Yang | |
| 2010/0208385 A1 | 8/2010 | Toukairin | |
| 2010/0235678 A1* | 9/2010 | Kompella et al. | 714/6 |
| 2010/0281202 A1* | 11/2010 | Abali et al. | 711/103 |
| 2010/0318721 A1* | 12/2010 | Avila et al. | 711/103 |
| 2011/0138145 A1* | 6/2011 | Magruder et al. | 711/167 |
| 2011/0167049 A1 | 7/2011 | Ron | |
| 2011/0197035 A1 | 8/2011 | Na et al. | |

OTHER PUBLICATIONS

The PC Guide, "Logical Block Addressing (LBA)", Sep. 2, 2000, pp. 1-2, http://web.archive.org/web/20000902032612/http://www.pcguide.com/ref/hdd/bios/modesLBA-c.html.*

Robert Hinrichs, "Circular Buffer", Sep. 11, 2002, pp. 1-22, http://www.codeproject.com/Articles/2880/Circular-Buffer.*

Margaret Rouse, "Logical Block Addressing (LBA)", Apr. 2005, pp. 1-16, http://searchcio-midmarket.techtarget.com/definition/logical-block-addressing.*

Rosenblum, Mendel and Ousterhout, John K. (Feb. 1992), "The Design and Implementation of a Log-Structured File System." ACM Transactions on Computer Systems, vol. 10, Issue 1, pp. 26-52.

Rosenblum, "The Design and Implementation of a Log-structured File System", EECS Department, University of California, Berkeley, Technical Report No. UCB/CSD-92-696, Jun. 1992.

Garth Gibson and Milo Polte, "Directions for Shingled-Write and Two-Dimensional Magnetic Recording System Architectures: Synergies with Solid-State Disks", Parallel Data Lab, Carnegie Mellon Univ., Pittsburgh, PA, Tech. Rep. CMU-PDL-09-014 (2009).

Office Action dated Dec. 20, 2012 from U.S. Appl. No. 12/895,855, 22 pages.

Interview Summary dated Apr. 2, 2013 from U.S. Appl. No. 12/895,855, 3 pages.

Office Action dated Jan. 10, 2014 from U.S. Appl. No. 12/895,855, 28 pages.

* cited by examiner

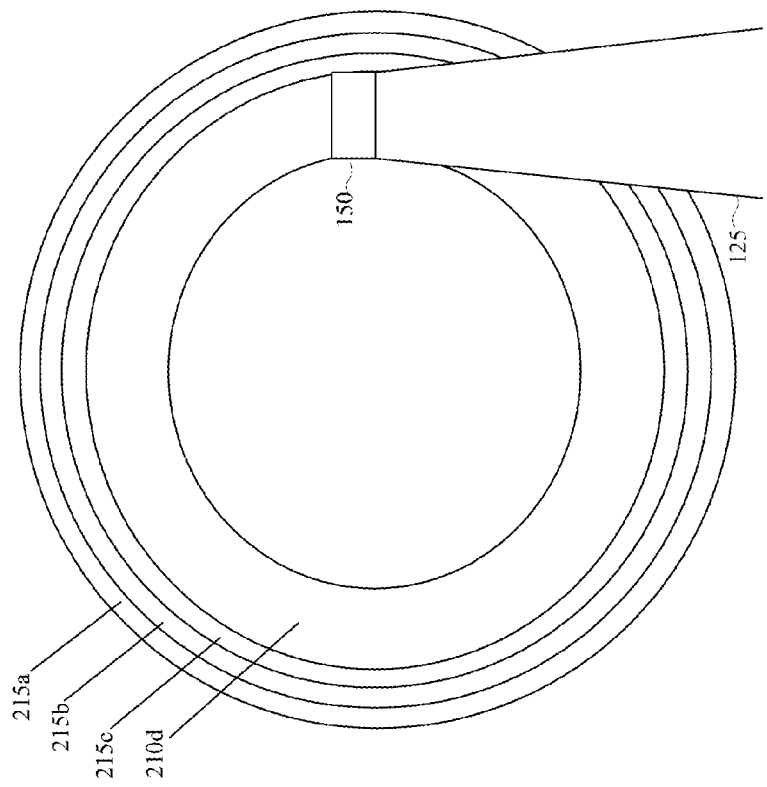
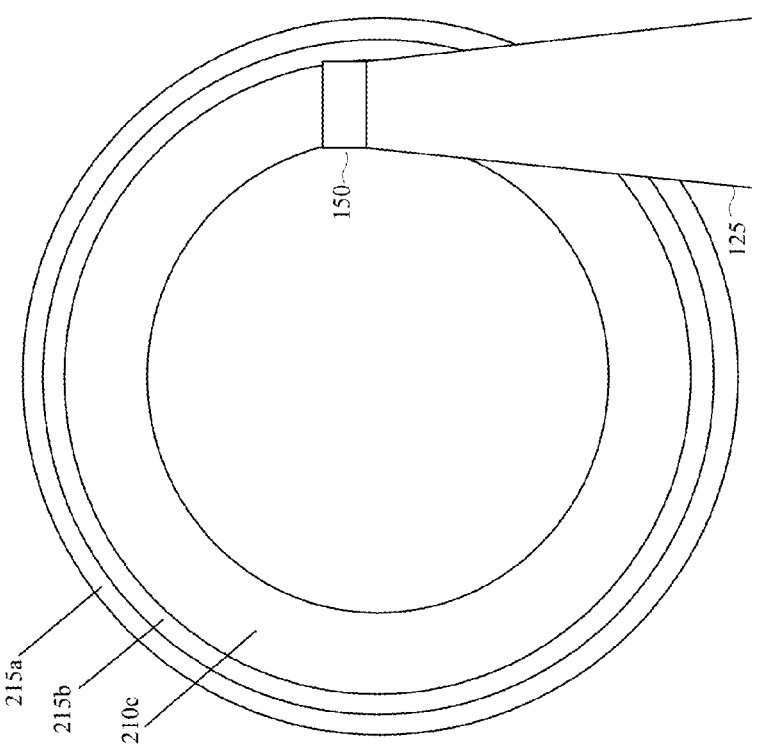
FIG. 2C
FIG. 2D

US 8,756,361 B1

DISK DRIVE MODIFYING METADATA CACHED IN A CIRCULAR BUFFER WHEN A WRITE OPERATION IS ABORTED

This application is a continuation-in-part of U.S. patent application Ser. No. 12/895,855 filed on Oct. 1, 2010 the specification of which is incorporated herein by reference.

BACKGROUND

Disk drives are commonly used to store data in computers, data bases, digital video recorders, and other devices. A disk drive comprises a rotating magnetic disk and a head actuated over the disk to magnetically write data to and read data from the disk. The disk drive may write data to and read data from the disk in response to write/read commands from a host that uses the disk drive for data storage. Typically, the host addresses data stored in the disk drive using logical addresses. The disk drive maintains a translation table mapping the logical addresses from the host to physical addresses of the corresponding data on the disk. When the host later requests data from the disk drive at certain logical addresses, the disk drive uses the translation table to locate the requested data on the disk.

The disk drive may update the translation table in a buffer as the disk drive writes data to the disk. The disk drive may later write the updated translation table in the buffer to the disk for later use. However, due to an unexpected power loss, the disk drive may be unable to write the updates in the translation table to the disk, in which case the updates may be lost.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIGS. 2A-2D show an example of shingle writing according to an embodiment of the present invention;

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
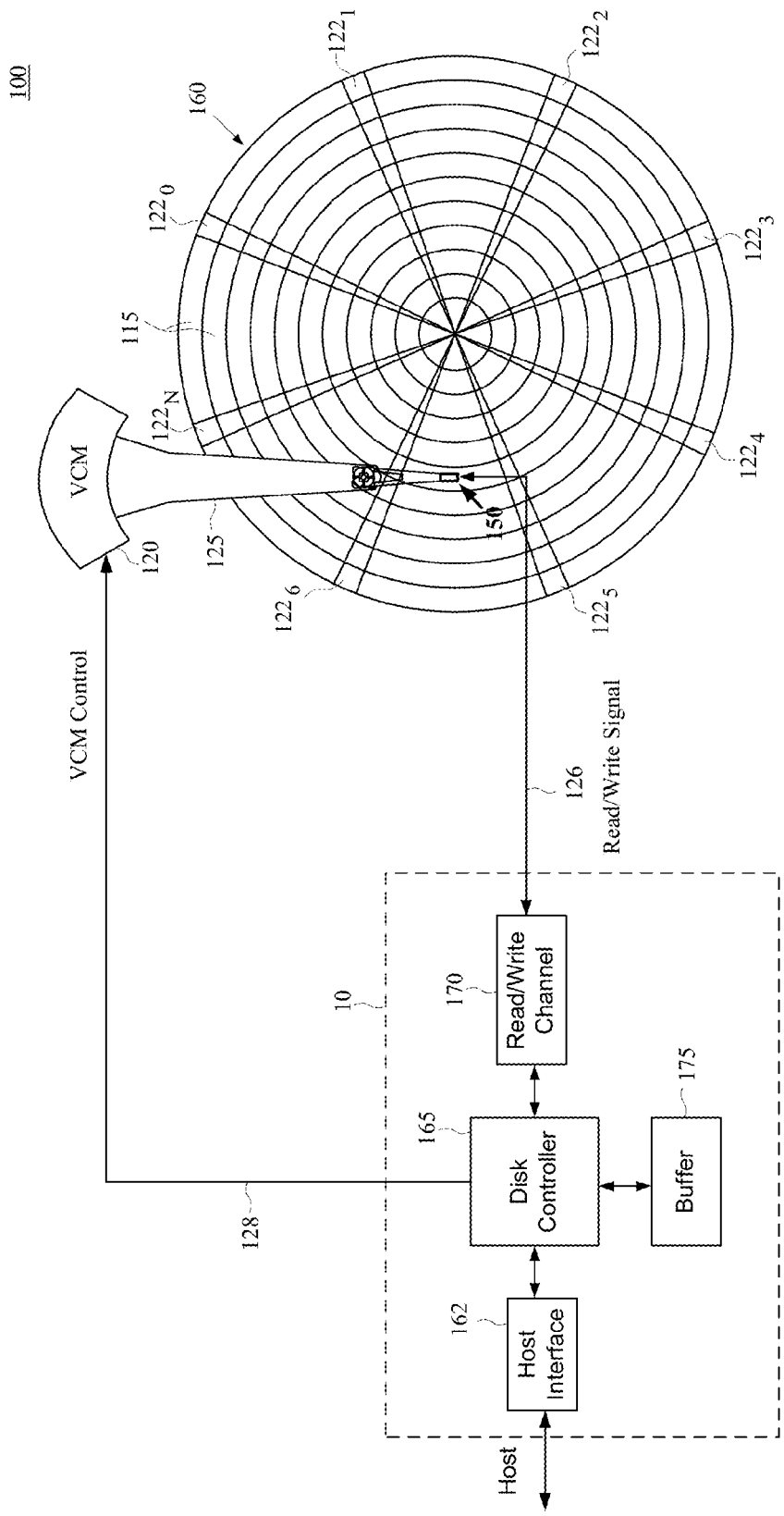
FIG. 1 is a block diagram of a disk drive according to an embodiment of the present invention.

FIG. 1 shows a disk drive 100 according to an embodiment of the present invention. The disk drive 100 comprises a controller 10, a rotating magnetic disk 160, an actuator arm 125, a voice coil motor (VCM) 120, and a head 150 attached to the distal end of an actuator arm 125. The actuator arm 125 is rotated about a pivot by the VCM 120 to position the head 150 radially over the disk 160. A spin motor (not shown) rotates the disk 160.

The disk 160 comprises a number of radially spaced, concentric tracks 115. Each track 115 may be further divided into a number of data sectors (not shown) that are spaced circumferentially along the track 115. The data sectors may be used to store user data and/or other information on the disk 160. The disk 160 may also comprise a plurality of angularly spaced servo wedges $122_0$-$122_N$, each of which may include embedded servo information (e.g., servo bursts) that can be read from the disk 160 by the head 150 to determine the position of the head 150 over the disk 160. The data sectors may be located between the servo wedges $122_0$-$122_N$.

The controller 10 comprises a disk controller 165, a read/write channel 170, a host interface 162, and a buffer 175 as shown in the example in FIG. 1. The disk controller 165 may be implemented using one or more processors for executing instructions (firmware) stored in memory, such as a volatile or non-volatile memory. The instructions may be executed by the one or more processors to perform the various functions of the disk controller 165 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The read/write channel 170 is configured to receive data to be written to the disk 160 from the disk controller 165 and process the data into a write signal 126, which is outputted to the head 150. The head 150 converts the write signal 126 into a magnetic field that magnetizes the surface of the disk 160 based on the write signal 126, thereby magnetically writing the data on the disk 60. The read/write channel 170 is also configured to receive a read signal 126 from the head 150 based on the magnetization of the disk surface under the head 150. The read/write channel 170 processes the read signal 126 into data, thereby recovering the data from the disk 160, and outputs the recovered data to the disk controller 165.

The host interface 162 is configured to interface the disk drive 100 with a host (e.g., host processor) that uses the disk drive 100 for data storage. The disk controller 165 receives commands (e.g., read/write commands) and data from the host via the host interface 162. The disk controller 165 also outputs data (e.g., data requested by a host read command) to the host via the host interface 162. The host interface 162 may interface with the host according to the serial advanced technology attachment (SATA) standard or other standard.

During normal write/read operations, the disk controller 165 may write data to and read data from the disk 160 in response to write/read commands from the host. When the disk controller 165 receives a write command via the host interface 162, the disk controller 165 may temporarily hold the corresponding data from the host in the buffer 175 (e.g., DRAM) and transfer the data from the buffer to the read/write channel 170 to write the data on the disk 160. The disk controller 165 may notify the host via the host interface 162 when the write command is completed (e.g., after the data for the write command has been successfully written to the disk 160). Similarly, when the disk controller 165 receives a read command from the host via the host interface 162, the disk controller 165 may read the data requested by the read command from the disk 160 using the read/write channel 170, temporarily hold the read data in the buffer 175 and output the read data from the buffer 175 to the host via the host interface 162.

The host may address data in write/read commands using logical addresses (LBAs), in which each LBA addresses a block of data. The disk controller 165 may maintain a translation table mapping the LBAs from the host to physical addresses of the corresponding data on the disk 160. The translation table may also be referred to as a mapping table. When the disk controller 165 receives a host read command requesting data at certain LBAs, the disk controller 165 uses the translation table to translate the LBAs to the corresponding physical addresses on the disk 160 to locate the requested data on the disk 160. The use of LBAs allows the host to address data stored in the disk drive 100 without having to know the physical locations of the data on the disk 160.

As the disk controller 165 writes data from the host to the disk 160, the disk controller 165 may update the translation table to map the LBAs of the data to the corresponding physical addresses on the disk 160. This allows the disk controller 165 to later locate the data on the disk 160 when the disk controller 160 receives a read command from the host requesting data at the corresponding LBAs. The disk controller 160 may temporarily store the translation table in the buffer 175 and update the translation table in the buffer 175 as the disk controller 165 writes data to the disk 160. The disk controller 165 may write the updated translation table to the disk 160 at regular intervals to store the updates on the disk 160.

To increase the data storage capacity of the disk 160, the disk controller 165 may write data to the disk 160 using shingle writing, in which data is written to sequential tracks 115 on the disk 160 in one direction. The direction may be from the outer diameter (OD) to the inner diameter (ID) of the disk 160 or the opposite direction. As discussed below, shingle writing allows the disk drive 100 to write narrower tracks 115, and hence increase the storage capacity of the disk 160, without reducing the dimensions of the head 150.

Figure 2B:
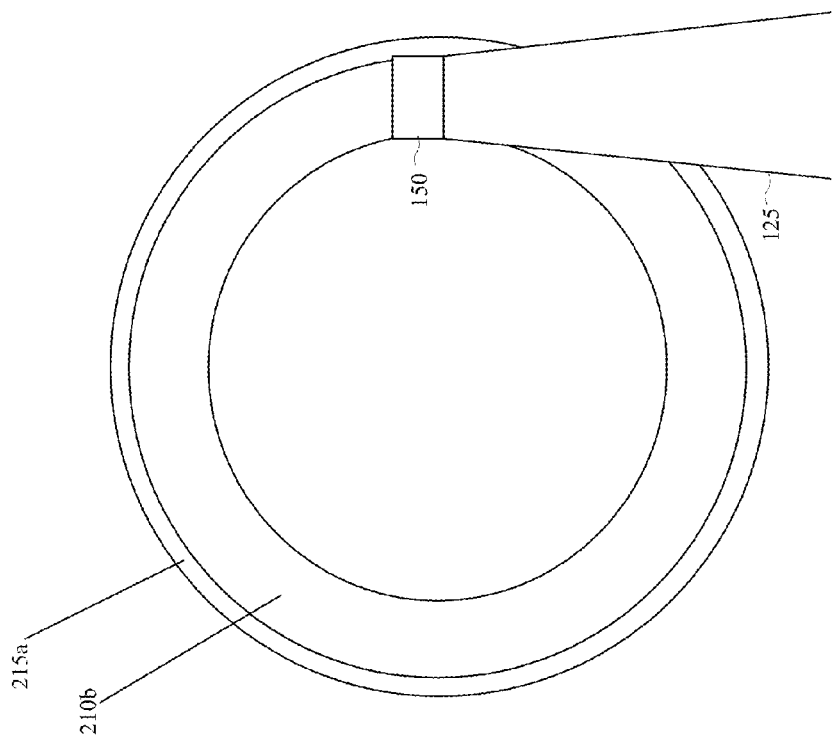
Figure 2A:
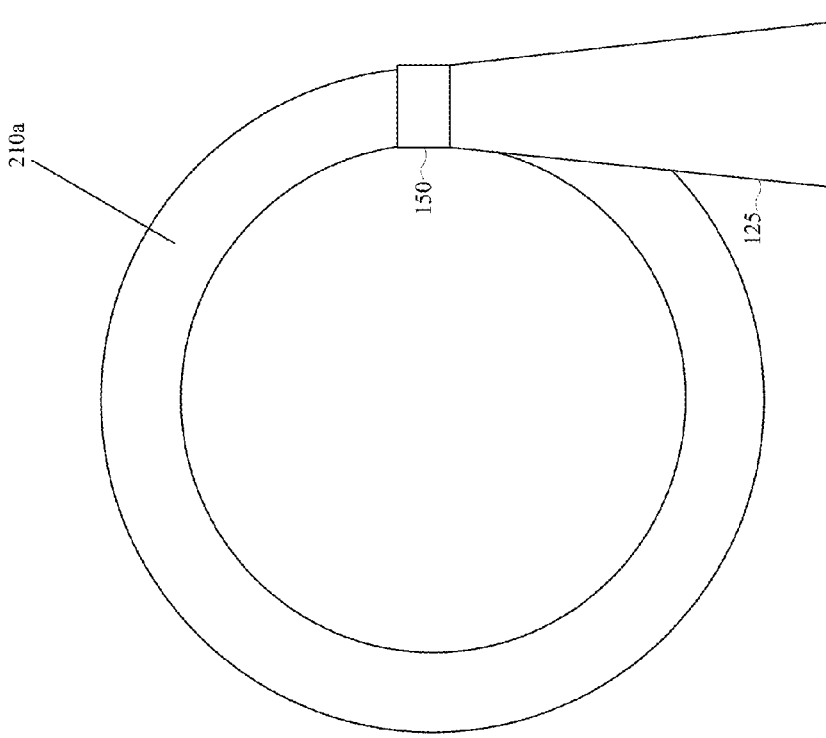

An example of shingle writing is illustrated in FIGS. 2A-2D, which shows the progression of a shingle write to the disk 160. In FIG. 2A, the head 150 writes data to the disk 160 in a first circular band 210a. In FIG. 2B, the head 150 is offset by a small amount from its position in FIG. 2A. The head 150 then writes subsequent data to the disk 160 in a second circular band 210b. The second circular band 210b overlaps and overwrites most of the first circular band 210a, leaving a narrow portion of the first circular band 210a that defines a first narrow track 215a. In FIG. 2C, the head 150 is offset again and the head 150 writes subsequent data to a third circular band 210c. The third circular band 210c overlaps and overwrites most of the second circular band 210b, leaving a narrow portion of the second circular band 210b that defines a second narrow track 215b. In FIG. 2D, the head 150 is offset again and the head 150 writes subsequent data to a fourth circular band 210d. The fourth circular band 210d overlaps and overwrites most of the third circular band 210c, leaving a narrow portion of the third circular band 210c that defines a third narrow track 215c. This process may be repeated to write data on the disk 160. Thus, shingle writing allows the disk drive 100 to write narrower tracks for given head dimensions, thereby increasing the storage capacity of the disk 160.

In shingle writing, data is written to the tracks 115 in a sequential manner. As a result, the physical address corresponding to an LBA changes each time the disk drive rewrites data for the LBA. As discussed above, the disk controller 165 may maintain a translation table in the buffer 175 providing logical-to-physical mapping information for data stored on the disk 160, and update the translation table as data is written to the disk 160. The disk controller 165 may write the updates in the translation table to the disk 160 at regular intervals to store the updates on the disk 160. However, if the disk drive 100 experiences an unexpected power loss before the updates are written to the disk 160, then the updates in the translation table may be lost.

To avoid losing updates in the translation table due to an unexpected power loss or other cause, the disk controller 165 may also write metadata files to the disk 160 as data is written to the disk 160. The metadata files may be interspersed or interleaved with the data written on the disk 160. Each metadata file may include logical-to-physical mapping information for data written on the disk 160. Thus, the metadata files provide a redundant copy of logical-to-physical mapping information in the translation table. If the disk drive 100 loses power before updates in the translation table can be written to the disk 160, then, on the next power cycle, the disk controller 110 can read the metadata files from the disk 160 and use the read metadata files to reconstruct the updates in the translation table.

Figure 3:
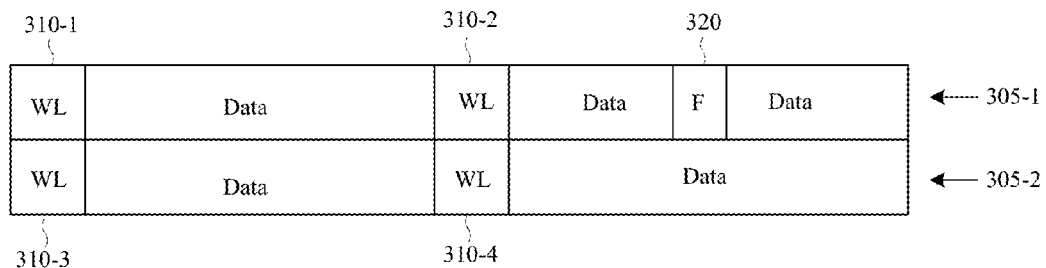
FIG. 3 illustrates a metadata scheme according to an embodiment of the present invention.

FIG. 3 illustrates a metadata scheme according to an embodiment of the present invention. FIG. 3 shows an example of two tracks 305-1 and 305-2, in which the left hand of each track 305-1 and 305-2 in FIG. 3 corresponds to the beginning of track. In this example, the disk controller 165 may first write data to track 305-1 and then write data to track 305-2 during a shingle write. Data is written on each track 305-1 to 305-2 from left to right in FIG. 3.

As shown in the example in FIG. 3, each track 305-1 and 305-2 includes data and metadata files 310-1 to 310-4 and 320 interspersed or interleaved with the data on the disk 160. For ease of illustration, the servo wedges $122_0$-$122_N$ are not shown in FIG. 3. The metadata files 310-1 to 310-4 and 320 may include two types of metadata files. The first type of metadata files may be referred to as write logs 310-1 to 310-4 and the second type of metadata files 320 may be referred to as footers, both of which are discussed below.

Each write log 310-1 to 310-4 may include logical-to-physical mapping information for data on the disk 160 preceding the write log 310-1 to 310-4. The disk controller 165 may write the write logs 310-1 to 310-4 at regular locations on the tracks. For example, the disk controller 165 may write a write log at the beginning of each track 305-1 and 305-2 and a write log at the middle of each track 305-1 and 305-2, as shown in FIG. 3. Each write log located at the beginning of a track 305-1 and 305-2 may include logical-to-physical mapping information for data in the preceding track. For example, write log 310-3 may include logical-to-physical mapping information for data in preceding track 305-1. Each write log located at the middle of a track 305-1 and 305-2 may include logical-to-physical mapping information for data preceding the write log in the same track and a portion or all of the data in the preceding track. For example, write log 310-4 may include logical-to-physical mapping information for data preceding write log 310-4 in the same track 305-2 (i.e., data to the left of write log 310-4 in track 302-2 in FIG. 3) and a portion or all of the data in preceding track 305-1. In one embodiment, each write log 310-1 to 310-4 may include a duplicate copy of some of the logical-to-physical mapping information in one or more preceding write logs 310-1 to 310-4, as discussed further below.

Each footer 320 may include logical-to-physical mapping information for data on the disk 160 preceding the footer 320. In one embodiment, the disk controller 165 may write a footer when a write command is completed (e.g., a write command from the host). In this embodiment, when the disk controller 165 finishes writing data on the disk 160 for a write command, the disk controller 165 may write a footer 320 at the end of the data for the write command. The footers 320 are not written at fixed, regular locations on the tracks 305-1 and 305-2. Rather, a footer 320 is written on the disk 160 when the disk controller 165 completes a write command, which may occur at various locations on a track. Thus, when a write command is completed, instead of abandoning an unused portion of a track until the next write log location, a footer may be written at the end of the data for the write command to store a metadata file for the data. It is possible to write more than one footer, if necessary, to maintain a minimum level of redundancy.

In one embodiment, the disk controller 165 may only notify the host that a write command is completed when the corresponding footer 320 is written on the disk 160. For example, certain host commands may require that data for a write command be successfully written on the disk 160 (committed to the disk) before the disk controller 165 notifies the host that the write command is completed. In this example, the corresponding footer may also need to be written on the disk 160 before the disk controller 165 notifies the host that the write command is completed.

In one embodiment, the disk controller 165 may maintain a circular buffer that stores logical-to-physical mapping information for data recently written to the disk 160. The circular buffer may have a predetermined length. In this embodiment, as the disk controller 165 writes data to the disk 160, the disk controller 165 writes logical-to-physical mapping information for the data in the circular buffer. When the circular buffer is full, the disk controller 165 may start overwriting the oldest logical-to-physical mapping information in the circular buffer with the logical-to-physical mapping information for the most recent data written to the disk 160. The circular buffer is not to be confused with the buffer 175 in FIG. 1. The circular buffer may reside in the buffer 175 or other memory in the disk drive 100.

In one embodiment, when the disk controller 165 writes a metadata file (e.g., write log or footer) to the disk 165, the disk controller 165 may include the current contents of the circular buffer in the metadata file. Thus, a metadata file on the disk 165 may include the contents of the circular buffer at the time the metadata file is written on the disk 165.

Figure 4:
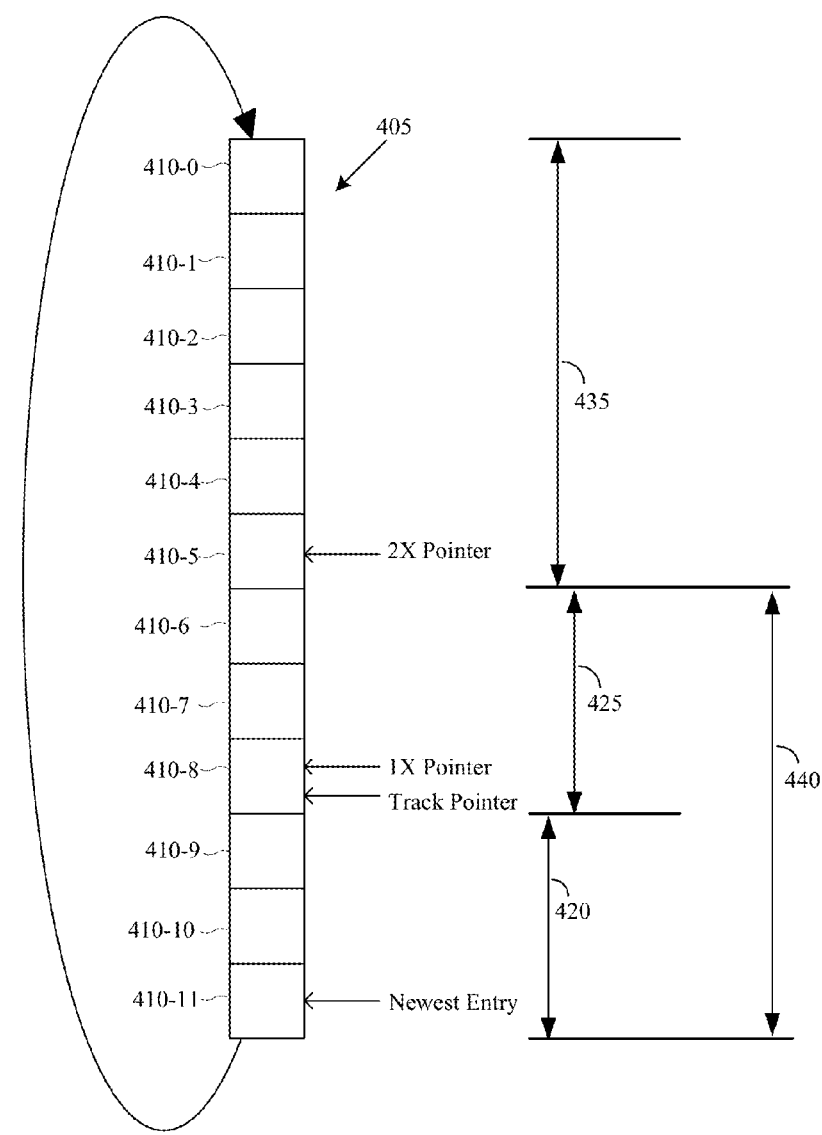
FIG. 4 shows a circular buffer according to an embodiment of the present invention.

FIG. 4 shows an example of a circular buffer 405 that may be used to store logical-to-physical mapping information according to an embodiment of the present invention. In the example in FIG. 4, the circular buffer 405 includes slots 410-0 to 410-11 for twelve entries. It is to be appreciated that the circular buffer 405 is not limited to twelve slots and may include any number of slots. Each entry may include logical-to-physical mapping information for data corresponding to one or more LBAs. For example, when the data corresponds to a sequence of LBAs mapped to a sequence of physical addresses, the logical-to-physical mapping information for the data may be compressed using run length compression and stored as one entry in the circular buffer 405.

In one embodiment, the disk controller 165 may write entries in the circular buffer 410 starting at slot 410-0. When the circular buffer 405 becomes full, the disk controller 165 may loop back to slot 410-0 and start overwriting the oldest entry with the newest entry, which includes logical-to-physical mapping information for the most recent data written to the disk 160.

The disk controller 165 may maintain a plurality of pointers for the circular buffer 405 including a newest entry pointer, a 1X pointer, a 2X pointer and a track pointer.

The newest entry pointer identifies the newest entry in the circular buffer. The newest entry includes the logical-to-physical mapping for the most recent data written to the disk 160. As writing occurs, the newest entry pointer is advanced as each entry is added.

The 1X pointer identifies the first entry in the circular buffer 405 that is a duplicate copy of logical-to-physical mapping information in the immediately preceding write log. The 1X pointer is advanced to the position of the newest entry pointer each time a write log is written to the disk 160.

The 2X pointer identifies the first entry in the circular buffer 405 that is a duplicate copy of logical-to-physical mapping information in both the last two preceding write logs. Thus, the 2X pointer identifies the first entry that is at least doubly redundant. When a write log is written to the disk 160, the 1X pointer is advanced to the position of the newest entry pointer and the 2X pointer is advanced to the old position of the 1X pointer.

The track pointer points to the first entry in the circular buffer 405 that is included in the write log at the beginning of the track. The track pointer is advanced to the position of the newest entry pointer each time a write log is written at the beginning of a track.

The entries between various pointers may be described as follows. The entries 420 between the newest entry pointer and the 1X pointer include logical-to-physical mapping information for data written after the immediately preceding write log. The entries 425 between the 1X pointer and the 2X pointer include logical-to-physical mapping information for data written between the two most recent preceding write logs. Thus, the entries 425 between the 1X pointer and the 2X pointer include logical-to-physical mapping information that is a duplicate copy of logical-to-physical mapping information in the immediately preceding write log. The entries 435 before the 2X pointer include logical-to-physical mapping information for data written before the second most recent preceding write log. The entries between the newest entry pointer and the track pointer include logical-to-physical mapping information for data written on the current track.

As discussed above, when a metadata file is written to the disk 160, the disk controller 165 may include the current contents of the circular buffer 405 in the metadata file. For example, the metadata file may include a header and a payload. The disk controller 165 may include the pointers in the header of the metadata file and may include the entries in the circular buffer 405 in the payload of the metadata file. The disk controller 165 may also include an identifier in the header identifying the metadata file, as discussed further below.

Referring back to the example in FIG. 3, when the disk controller 165 writes write log 310-4 to the disk 160, the disk controller 165 may include the current contents of the circular buffer 405 in write log 310-4. In this example, the newest entry pointer identifies the newest entry in write log 310-4 that includes the logical-to-physical mapping information for the data immediately preceding write log 310-4. The 1X pointer identifies the first entry in write log 310-4 that includes a duplicate copy of logical-to-physical mapping information in the immediately preceding write log 310-3. In this example, the track pointer is at the same position as the 1X pointer since the immediately preceding write log 310-3 is at the beginning of the track 305-2. The 2X pointer identifies the first entry in write log 310-4 that includes a duplicate copy of logical-to-physical mapping information in the second preceding write log 310-2. Thus, the 2X pointer identifies the first entry in write log 310-4 that is at least doubly redundant on the disk 160.

In one embodiment, when the entries 440 between the newest entry pointer and the 2X pointer fill the circular buffer 405, the disk controller 165 immediately writes the next write log. This may be done to maintain a minimum level of redundancy of logical-to-physical mapping information on the disk 160. In this embodiment, the disk controller 165 may monitor the position of the 2X pointer as data is written to the disk 160. If the entries 440 between the newest entry pointer and the 2X pointer reach the length of the circular buffer 405, then the disk controller 165 may stop writing data, immediately write the next write log, and resume writing data after the next write log. In this example, the portion of the track between the location where the writing stops and the next write log may be left unused.

Figure 5:
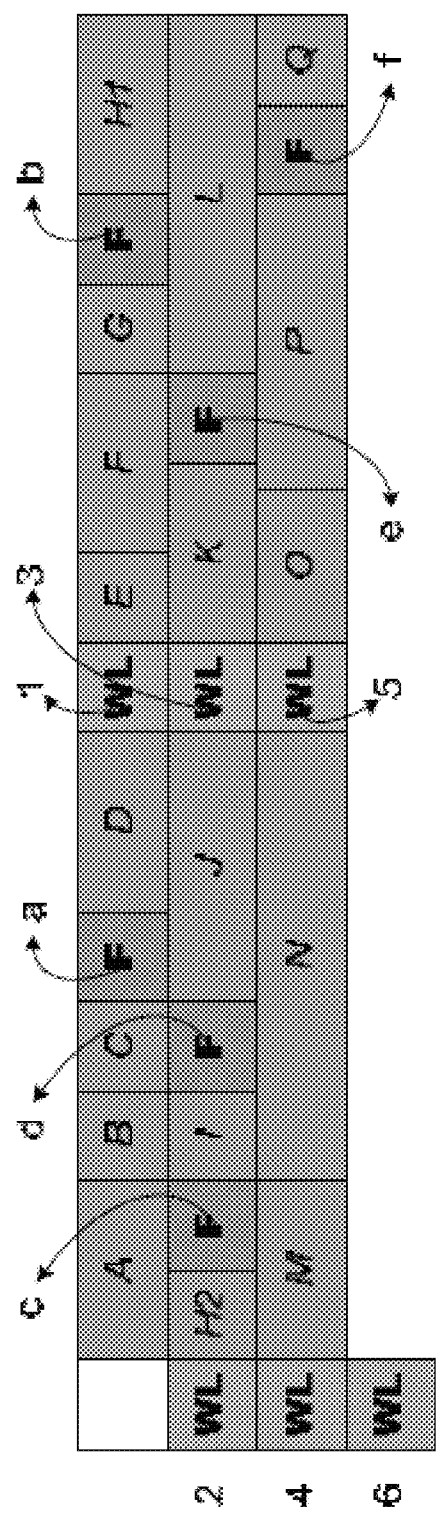
FIG. 5 shows an example of tracks including data and metadata file interspersed with the data according to an embodiment of the present invention.

An example of a metadata file scheme will now be described according to an embodiment of the present invention with references to FIGS. 5 and 6. FIG. 5 shows an example of tracks including data and metadata files (write logs and footers) interspersed with the data, and FIG. 6 shows an example of the entries in the metadata files.

Referring to FIG. 5, each row corresponds to a track with the left hand of FIG. 5 corresponding to the beginning of each track. The capital letters A-Q in the tracks represent sequential extents of user data. FIG. 5 also shows write logs (WL) with numeric labels (1-6) and footers (F) labeled with lower-case letters (a-f).

Figure 6:
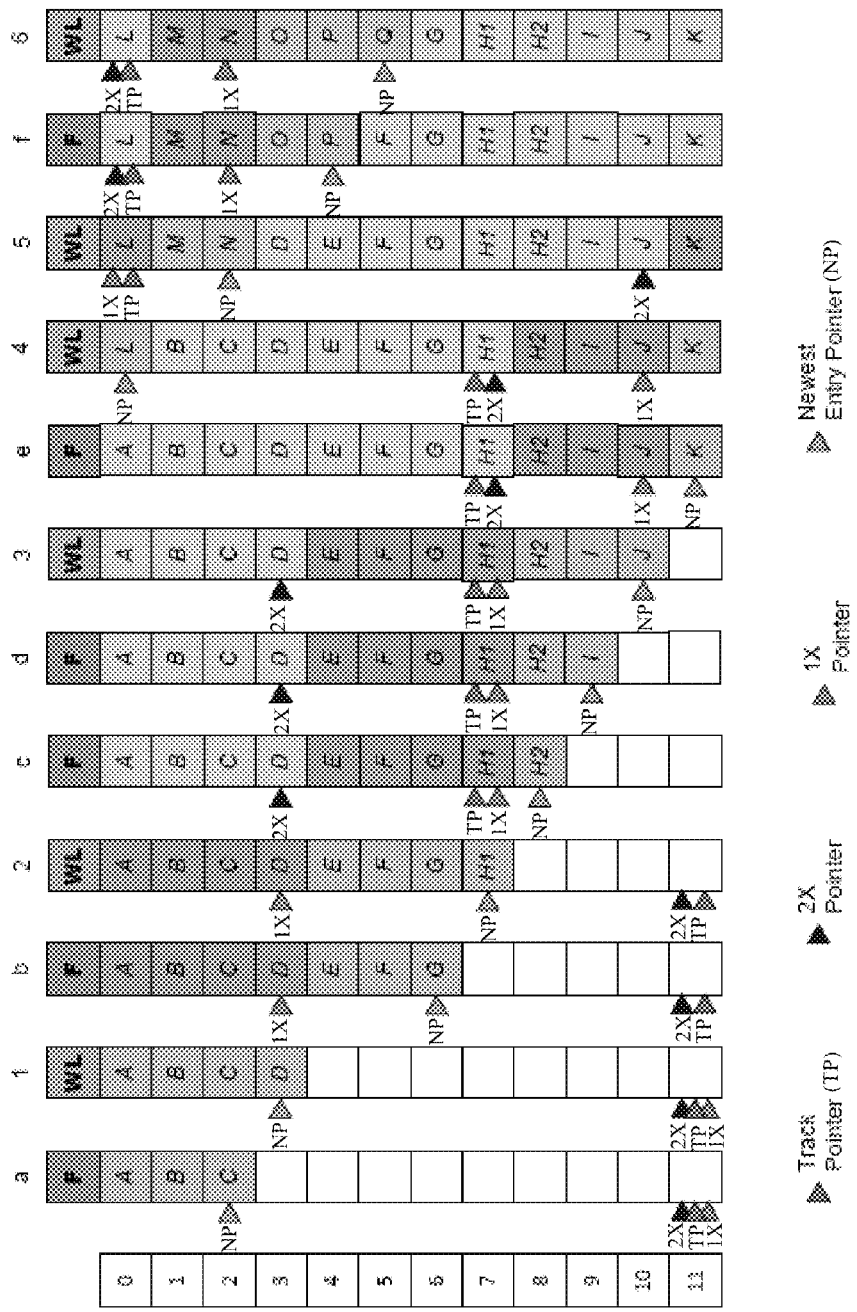
FIG. 6 shows an example of entries in the metadata files shown in FIG. 5 according to an embodiment of the present invention.

FIG. 6 shows an example of the contents of each write log and footer shown in FIG. 5. FIG. 6 also shows the locations of the newest entry pointer, the 1X pointer, the 2X pointer, and the track pointer for each write log and footer. In this example, it is assumed that the circular buffer 405 is empty at the beginning of data extent A and the payload of each write log and footer has space for twelve entries.

As shown in FIG. 6, footer (a) includes logical-to-physical mapping information for data extents A-C, which precede footer (a).

Write log(1) includes logical-to-physical mapping information for data extents A-D. Thus, write log(1) includes the logical-to-physical mapping information in footer (a) and adds the logical-to-physical mapping information for data extent D, which is between footer (a) and write log(1).

Footer (b) includes logical-to-physical mapping information for data extents A-G. Thus, in this example, footer (b) includes all of the logical-to-physical mapping information in write log(1) and adds logical-to-physical mapping information for data extents E-G.

Write log(2) includes logical-to-physical mapping information for data extents A-H1. For write log(2), the 1X pointer points to the first entry in write log(2) that includes a duplicate copy of mapping information in the preceding write log(1).

Footer (c) includes logical-to-physical mapping information for data extents A-H2. For footer (c), the 1X pointer points to the entry corresponding to data extent H1 because this is the first entry in footer (c) that includes a duplicate copy of mapping information in the immediately preceding write log(2). The 2X pointer points to the entry corresponding to data extent D because this is the first entry in footer (c) that includes a duplicate copy of mapping information in the second preceding write log(1). The track pointer coincides with the 1X pointer since the immediately preceding write log(2) is located at the beginning of the track. Footer (d) includes logical-to-physical mapping information for data extents A-I.

Write log(3) includes logical-to-physical mapping information for data extents A-J. For write log(3), the 1X pointer points to the entry corresponding to data extent H1 because this is the first entry in write log(3) that includes a duplicate copy of mapping information in the immediately preceding write log(2). The 2X pointer points to the entry corresponding to data extent D because this is the first entry in write log(3) that includes a duplicate copy of mapping information in the second preceding write log(1). Footer (e) includes logical-to-physical mapping information for data extents A-K.

Write log(4) includes logical-to-physical mapping information for data extents B-L. In this example, the entry corresponding to data extent L overwrites the entry corresponding to data extent A. The newest entry pointer points to the entry corresponding to data extent L since data extent L immediately precedes write log(4). For write log(4), the 1X pointer points to the entry corresponding to data extent J because this is the first entry in write log(4) that includes a duplicate copy of mapping information in the immediately preceding write log(3). The 2X pointer points to the entry corresponding to data extend H1 because this is the first entry in write log(4) that includes a duplicate copy of mapping information in the second preceding write log(2).

Write log(5) includes logical-to-physical mapping information for data extents D-N. In this example, the entries corresponding to data extents M and N overwrite the entries corresponding to data extents B and C. The newest entry pointer points to the entry corresponding to data extent N since data extent N immediately precedes write log(5). For write log(5), the 1X pointer points to the entry corresponding to data extent L because this is the first entry in write log(5) that includes a duplicate copy of mapping information in the immediately preceding write log(4). The 2X pointer points to the entry corresponding to data extend J because this is the first entry in write log(5) that includes a duplicate copy of mapping information in the second preceding write log(3). Footer (f) includes logical-to-physical mapping information for data extents F-P.

Write log(6) includes logical-to-physical mapping information for data extents G-Q. The newest entry pointer points to the entry corresponding to data extent Q since data extent Q immediately precedes write log(6). For write log(6), the 1X pointer points to the entry corresponding to data extent N because this is the first entry in write log(6) that includes a duplicate copy of mapping information in the immediately preceding write log(5). The 2X pointer points to the entry corresponding to data extent L because this is the first entry in write log(6) that includes a duplicate copy of mapping information in the second preceding write log(4).

Thus, each write log and footer adds new mapping information and repeats some of the mapping information in preceding write logs and/or footers.

Figure 7:
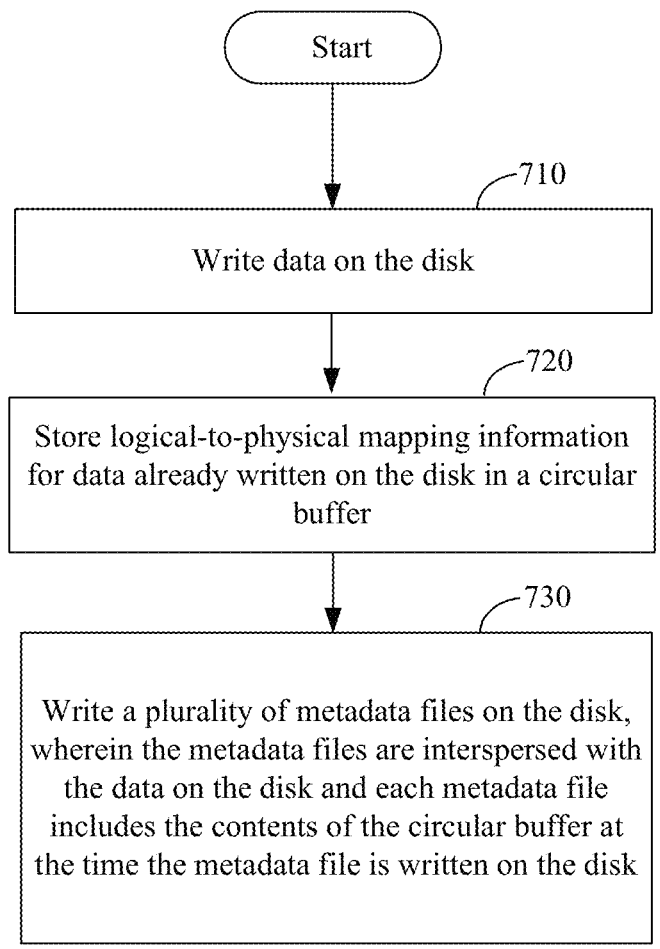
FIG. 7 is a flowchart of a method of writing logical-to-physical mapping information on a disk according to an embodiment of the present invention.

FIG. 7 is a flowchart illustrating a method of writing logical-to-physical mapping information on a disk 160 according to an embodiment of the present invention.

In step 710, data is written on the disk 710. In step 720, logical-to-physical mapping information for data already written on the disk is stored in a circular buffer. In step 730, a plurality of metadata files are written on the disk 160. The metadata files are interspersed with the data on the disk and each metadata file includes the contents of the circular buffer at the time the metadata file is written on the disk. It is to be appreciated that the writing of the metadata in step 730 can be performed in parallel with the writing of the data in step 710.

As discussed above, if updates in the translation are lost due to an unexpected power loss, then, on the next power cycle, the disk controller 165 can read metadata files (e.g., write logs and footers) on the disk to reconstruct the updates in the translation that were lost. This is because the metadata files provide a redundant copy of the logical-to-physical mapping information in the translation table.

In one embodiment, each write log may include an identifier in its header. For example, the identifier may include a sequence number that indicates the order of the write log relative to other write logs on the disk 160. In this example, the sequence number may be incremented for each write log written to the disk 160. This allows the disk controller 165 to identify the last write log written on the disk 160 based on the write log with the highest sequence number. Thus, when the disk controller 165 reads write logs on the disk 160 to reconstruct updates in the translation table, the disk controller 165 can start with the first write log written after the translation table was last saved on the disk 160 and read write logs until the last write log written on the disk 160 is reached. In this embodiment, the translation table last saved on the disk 160 may include the sequence number at the time the translation table was saved on the disk 160. The disk controller 165 may use this sequence number to identify the first write log written on the disk 160 after the translation table was last saved on the disk 160.

The footers may also include identifiers in their headers. For example, each footer may include an identifier indicating the immediately preceding write log. In this example, after reading the last write log, the disk controller 165 can look for any footers written after the last write log. If there is one or more footers written after the last write log, then the disk controller 165 can use the mapping information in the footers to reconstruct the updates in the translation table.

As discussed above, each write log and footer may include a duplicate copy of mapping information in preceding write logs and/or footers. This provides redundancy of the mapping information on the disk 160, allowing the disk controller 160 to obtain the mapping information needed to reconstruct the translation table even when one or more write logs and/or footers are defective. Referring to the example in FIG. 6, if write log(2) is defective, then the disk controller 165 can read write log(3) to obtain the mapping information for data extents E-H1 since write log(3) includes a duplicate copy of the mapping information for data extents E-H1. The disk controller 165 may identify the entries in write log(3) that are duplicate copies of the entries in detective write log(2) based on the location of the 1X pointer in write log(3).

A write operation may be aborted in the middle of writing a data extent, for example, if an error condition is detected such as a shock event or an off-track condition due to a defective servo sector. In another embodiment, the host may issue an abort command to the disk drive to abort a write operation. If a write operation is aborted, in one embodiment the logical-to-physical mapping information in the circular buffer is modified to account for the data that was not written to the disk. In this manner, the logical-to-physical mapping information in the circular buffer reflects the data actually written to the disk.

Figure 8:
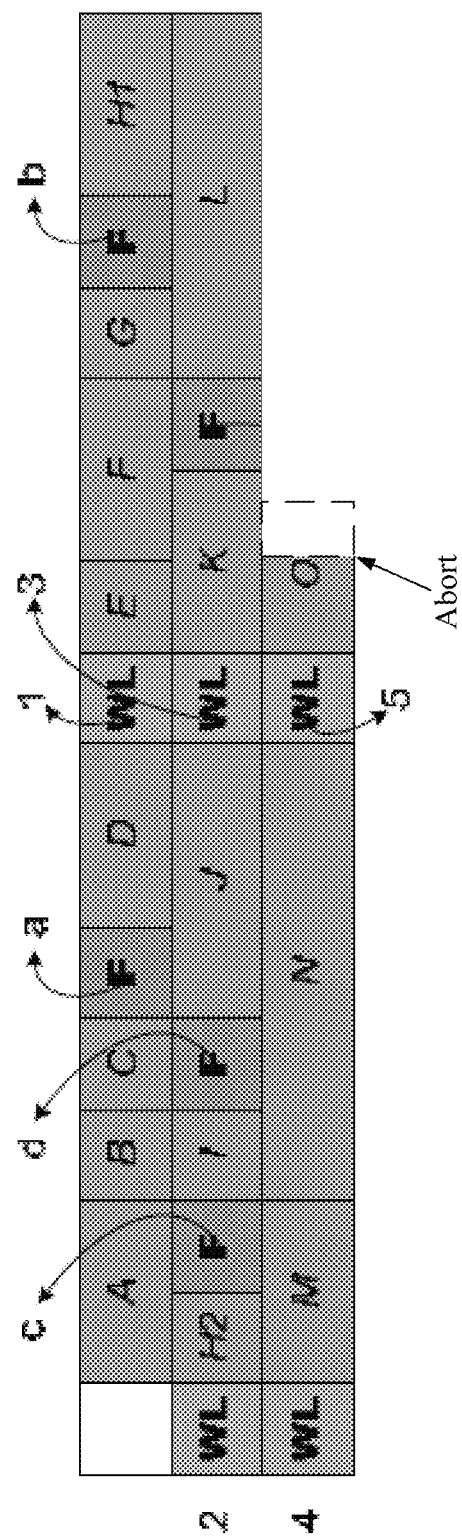
FIG. 8 shows example tracks similar to FIG. 5 except that a write operation is aborted while writing a sequential extent of user data according to an embodiment of the present invention.
Figure 9:
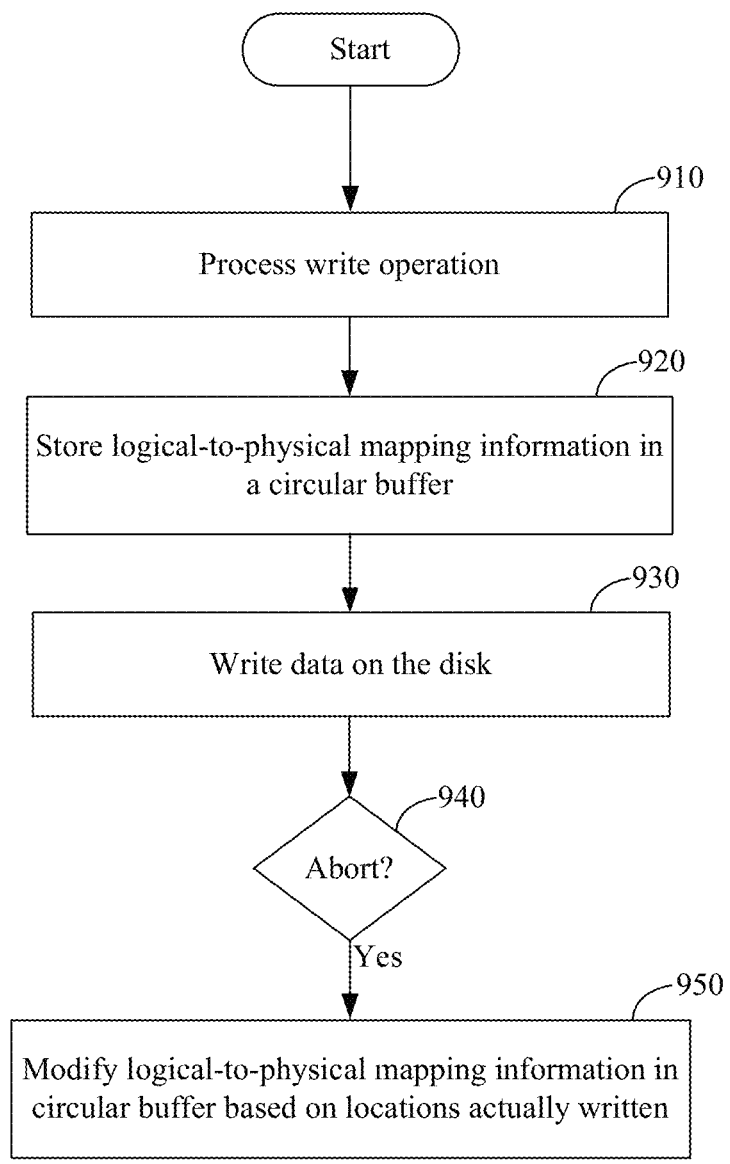
FIG. 9 is a flowchart of a method of modifying the logical-to-physical mapping information in the circular buffer when a write operation is aborted according to an embodiment of the present invention.
Figure 10A:
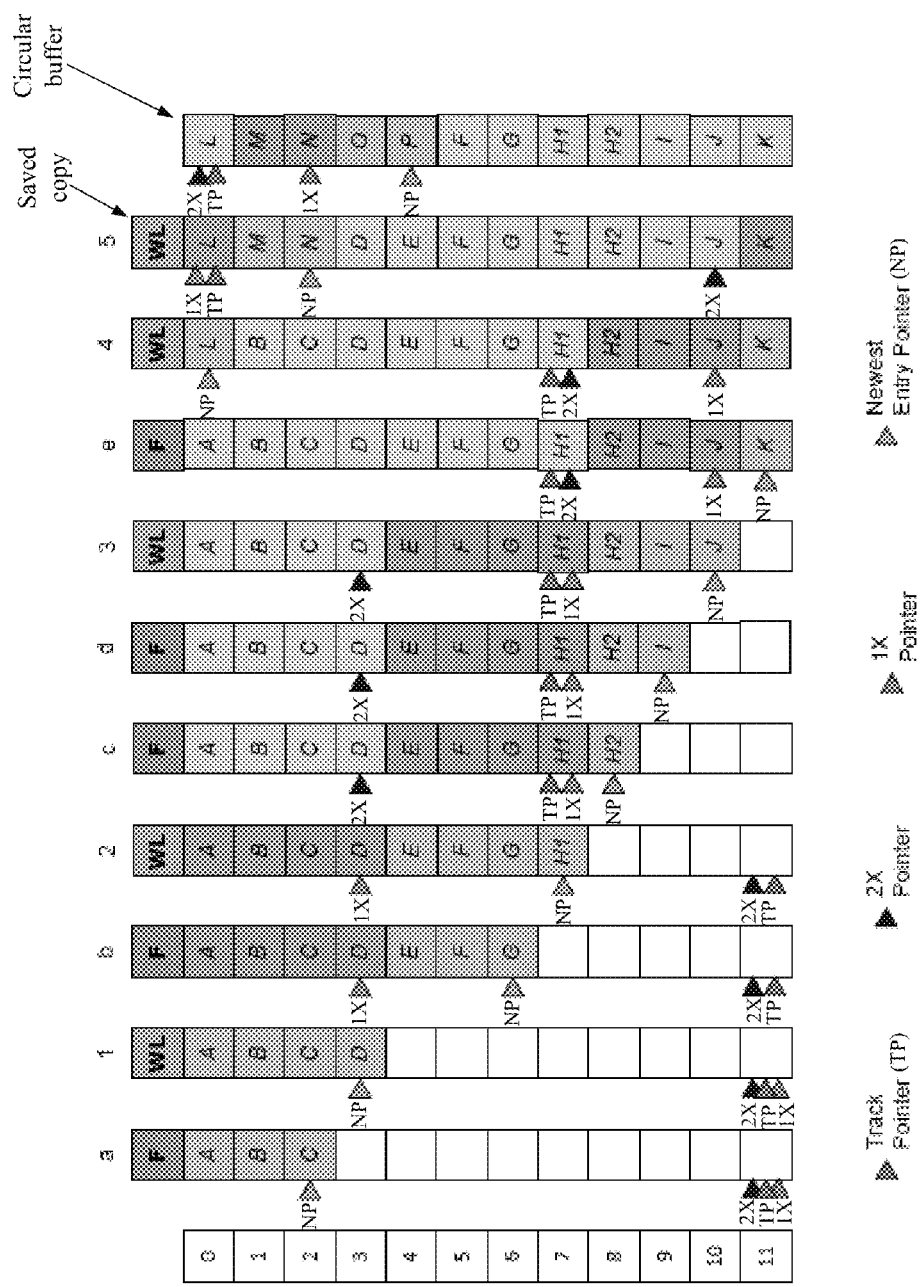
FIG. 10A shows example entries in the metadata files as well as the circular buffer prior to aborting the write operation shown in FIG. 8 according to an embodiment of the present invention.

FIG. 8 shows an example of a write operation for data extents O and P similar to FIG. 5 except that the write operation is aborted while writing data extent O to the disk. Referring to the flowchart of FIG. 9, when the write operation is processed in step 910, the logical-to-physical mapping information for the write operation (for data extents O and P of FIG. 5) are stored in the circular buffer in step 920 prior to writing the data to the disk. This is illustrated in FIG. 10A wherein the newest entry pointer (NP) points to the P entry after inserting the O and P entries into to the circular buffer. While writing the O data extent to the disk in step 930, the write operation is aborted in step 940 (and as illustrated in FIG. 8). When the write operation is aborted, only part of data extent O has been written to the disk, and therefore the O and P entries in the circular buffer as shown in FIG. 10A are incorrect. Accordingly, in an embodiment of the present invention the logical-to-physical mapping information in the circular buffer is modified in step 950 to account for the data that was not written to the disk due to aborting the write operation.

Figure 10B:
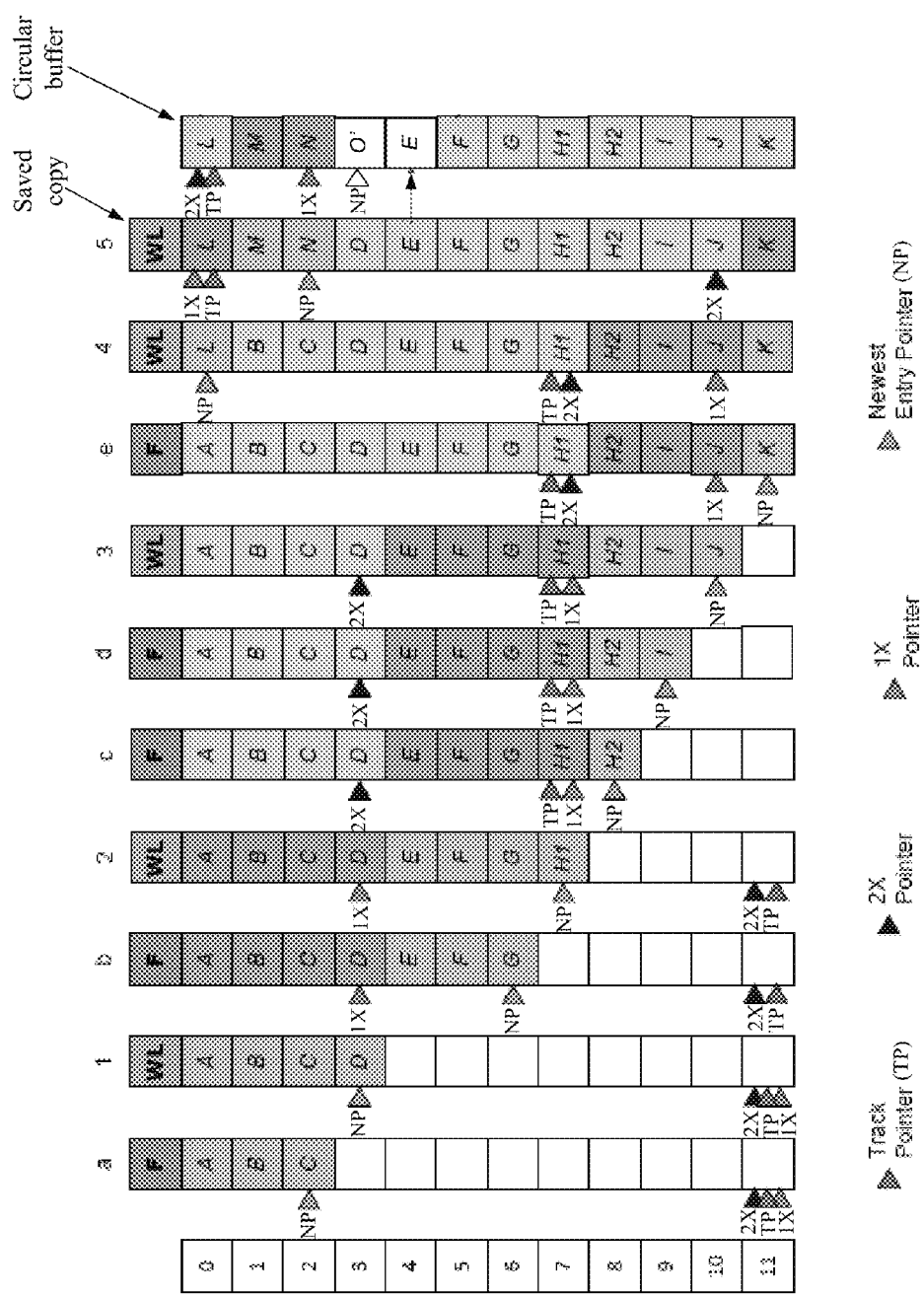
FIG. 10B illustrates how the logical-to-physical mapping information in the circular buffer may be modified to account for the aborted write operation according to an embodiment of the present invention.

The logical-to-physical mapping information in the circular buffer may be modified in any suitable manner to account for an aborted write operation. In one embodiment, a copy is saved of at least part of the content of the circular buffer when one of the metadata files is written on the disk. Referring to the example of FIG. 10A, a copy of the circular buffer may be saved when the most recent metadata file (WL 5) is written to the disk. When the write operation is aborted, the logical-to-physical mapping information in the circular buffer is modified using the copy to revert at least part of the circular buffer to a point prior to processing the aborted write operation. An example of this embodiment is illustrated in FIG. 10B wherein when the write operation is aborted in the middle of writing the O data extent (as shown in FIG. 8), the O entry in the circular buffer corresponding to the O data extent is modified to an O' entry to include the logical-to-physical mapping information corresponding to the data actually written to the disk prior to aborting the write operation. The entries in the circular buffer that correspond to data not written to the disk are reverted based on the saved version of the circular buffer. In the example of FIG. 10B, the P entry in the circular buffer corresponds to data not written to the disk due to aborting the write operation, and therefore the P entry is reverted by copying the E entry from the saved version of the circular buffer. In an alternative embodiment, instead of reverting entries in the circular buffer, the entries corresponding to unwritten data may simply be invalidated. Invalidating an entry in the circular buffer is usually an acceptable modification since there are typically redundant entries in the previously written metadata files (e.g., the E entry may simply be recovered from the previously written write log WL 5 in the example of FIG. 10B if needed).

When a write operation is aborted due to an error condition, the write operation may be re-executed starting from the point where the write operation was aborted. However, the write operation may be restarted at a different physical location away from the end of the previously written data. For example, if a write operation is aborted due to a defect in servo sectors, the write operation may be restarted after a physical gap of data sectors, or even after skipping one or more data tracks so as to avoid the defective area. In this embodiment, the entry in the circular buffer corresponding to where a write operation is aborted is split into two entries.

Referring to the example of FIG. 10B, if the write operation of the O and P data extents is retried after the abort operation, the O entry is split into a first O' entry comprising the logical-to-physical mapping information for the data written on the disk prior to aborting the write operation, and into a second O" entry comprising the logical-to-physical mapping information for the data written when the write operation is restarted. The logical-to-physical mapping information for the O" entry may be physically separated from the end of the logical-to-physical mapping information for the O' entry due to the error that led to the abort of the initial write operation. Accordingly, modifying the logical-to-physical mapping information in the circular buffer when a write operation is aborted helps ensure the entries in the circular buffer identify-data actually written to the disk.

In another embodiment, a host may send a command to the disk drive to abort a write operation. Referring to the example of FIG. 10A, the host may command the disk drive to abort the write operation after writing the O data extent to the disk. Since the host commands the disk to abort the write operation, the P data extent may never be written to the disk. When this happens the P entry previously inserted into the circular buffer prior to executing the write operation is either reverted (e.g., by copying the E entry from the saved copy), or invalidated as described above.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
a disk;
a head actuated over the disk; and
a controller configured to:
process a write operation to write data on the disk using the head;
prior to writing the data on the disk, store logical-to-physical mapping information in a circular buffer for the data to be written, wherein the logical-to-physical mapping information identifies locations on the disk to write the data;
write a plurality of metadata files on the disk using the head, wherein the plurality of metadata files are interspersed with the data on the disk and each of the metadata files includes contents of the circular buffer at a time the metadata file is written on the disk;
maintain a newest entry pointer identifying a head of the circular buffer; and
when the write operation is aborted, modify the logical-to-physical mapping information in the circular buffer by adjusting the newest entry pointer to correspond to the data last written to the disk.

2. The disk drive of claim 1, wherein the controller is further configured to modify the logical-to-physical mapping information by invalidating the logical-to-physical mapping information in the circular buffer corresponding to data not written on the disk due to aborting the write operation.

3. A method of operating a disk drive, the disk drive comprising a head actuated over a disk, the method comprising:
processing a write operation to write data on the disk using the head;
prior to writing the data on the disk, storing logical-to-physical mapping information in a circular buffer for the data to be written, wherein the logical-to-physical mapping information identifies locations on the disk to write the data;
writing a plurality of metadata files on the disk using the head, wherein the plurality of metadata files are interspersed with the data on the disk and each of the metadata files includes contents of the circular buffer at a time the metadata file is written on the disk;
maintain a newest entry pointer identifying a head of the circular buffer; and
when the write operation is aborted, modifying the logical-to-physical mapping information in the circular buffer by adjusting newest entry pointer to correspond to the data last written to the disk.

4. The method of claim 3, wherein modifying the logical-to-physical mapping information comprises invalidating the logical-to-physical mapping information in the circular buffer corresponding to data not written on the disk due to aborting the write operation.

5. A disk drive, comprising:
a disk;
a head actuated over the disk; and
a controller configured to:
process a write operation to write data on the disk using the head;
prior to writing the data on the disk, store logical-to-physical mapping information in a circular buffer for the data to be written, wherein the logical-to-physical mapping information identifies locations on the disk to write the data;
write a plurality of metadata files on the disk using the head, wherein the plurality of metadata files are interspersed with the data on the disk and each of the metadata files includes contents of the circular buffer at a time the metadata file is written on the disk;

save a copy of at least part of the content of the circular buffer when one of the metadata files is written on the disk; and when the write operation is aborted, modify the logical-to-physical mapping information in the circular buffer using the copy to revert at least part of the circular buffer to a point prior to processing the write operation.

6. The disk drive of claim 5, wherein the controller is further configured to revert the circular buffer based on the data of the write operation not written to the disk due to aborting the write operation.

7. A method of operating a disk drive, the disk drive comprising a head actuated over a disk, the method comprising:

processing a write operation to write data on the disk using the head;

prior to writing the data on the disk, storing logic-al-to-physical mapping information in a circular buffer for the data to be written, wherein the logical-to-physical mapping information identifies locations on the disk to write the data;

writing a plurality of metadata files on the disk using the head, wherein the plurality of metadata files are interspersed with the data on the disk and each of the metadata files includes contents of the circular buffer at a time the metadata file is written on the disk;

saving a copy of at least part of the content of the circular buffer when one of the metadata files is written on the disk; and when the write operation is aborted, modifying the logical-to-physical mapping information in the circular buffer using the copy to revert at least part of the circular buffer to a point prior to processing the write operation.

8. The method of claim 7, further comprising reverting the circular buffer based on the data of the write operation not written to the disk due to aborting the write operation.

\* \* \* \* \*